(12) United States Patent
Kao et al.

(10) Patent No.: US 9,049,387 B2
(45) Date of Patent: Jun. 2, 2015

(54) METHOD OF GENERATING VIEW-DEPENDENT COMPENSATED IMAGES

(71) Applicants: National Taiwan University, Taipei (TW); Himax Technologies Limited, Tainan (TW)

(72) Inventors: Chen-Tai Kao, Taipei (TW); Tai-Hsiang Huang, Taipei (TW); Homer H. Chen, Taipei (TW); Ling-Hsiu Huang, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 178 days.

(21) Appl. No.: 13/751,605

(22) Filed: Jan. 28, 2013

(65) Prior Publication Data

US 2014/0063268 A1 Mar. 6, 2014

Related U.S. Application Data

(60) Provisional application No. 61/697,697, filed on Sep. 6, 2012.

(51) Int. Cl.
*G03B 21/00* (2006.01)
*H04N 17/00* (2006.01)
(Continued)

(52) U.S. Cl.
CPC .............. *H04N 9/3185* (2013.01); *H04N 17/00* (2013.01); *G03B 21/56* (2013.01); *G03B 21/145* (2013.01); *H04N 9/31* (2013.01); *H04N 9/77* (2013.01); *H04N 13/0459* (2013.01); *H04N 13/0425* (2013.01); *G06K 9/4661* (2013.01);
(Continued)

(58) Field of Classification Search
CPC .... G03B 21/56; G03B 21/145; H04N 9/3182; H04N 9/3194; H04N 9/31; H04N 9/77; H04N 9/3185; H04N 13/0459; H04N 13/0425; G06K 9/4661
USPC ................. 353/121, 122; 348/189; 250/252.1
See application file for complete search history.

(56) References Cited

U.S. PATENT DOCUMENTS

2005/0271299 A1* 12/2005 Ajito et al. .................... 382/293
2007/0285422 A1* 12/2007 Nayar et al. .................. 345/426
2012/0127320 A1* 5/2012 Balogh ......................... 348/180

FOREIGN PATENT DOCUMENTS

CN 101466049 A 6/2009
TW 201106085 A 2/2011

OTHER PUBLICATIONS

Kao et al. "Compensating Specular Highlights for Non-Lambertian Projection Surfaces" (not published), 33 pages.
(Continued)

*Primary Examiner* — William C Dowling
*Assistant Examiner* — Magda Cruz
(74) *Attorney, Agent, or Firm* — Donald E. Stout; Stout, Uxa & Buyan, LLP

(57) ABSTRACT

A method of generating view-dependent compensated images is disclosed. A uniform image is projected on a reflective screen, resulting in a first captured image. The distribution of specular highlight is predicted according to the first captured image, thereby obtaining model parameters. Calibration images are estimated according to the model parameters and a viewing angle, and a compensated image is generated according to the calibration images at the viewing angle.

12 Claims, 3 Drawing Sheets

(51) Int. Cl.

| | |
|---|---|
| *G01D 18/00* | (2006.01) |
| *G12B 13/00* | (2006.01) |
| *H04N 9/31* | (2006.01) |
| *G03B 21/56* | (2006.01) |
| *G03B 21/14* | (2006.01) |
| *H04N 9/77* | (2006.01) |
| *H04N 13/04* | (2006.01) |
| *G06K 9/46* | (2006.01) |
| *G03B 17/54* | (2006.01) |

(52) U.S. Cl.
CPC ........... *H04N9/3182* (2013.01); *H04N 9/3194* (2013.01); *G03B 17/54* (2013.01)

(56) References Cited

OTHER PUBLICATIONS

Office Action Dated Feb. 2, 2015 in corresponding Chinese Patent Application No. 201310048289.X.

\* cited by examiner

METHOD OF GENERATING VIEW-DEPENDENT COMPENSATED IMAGES

CROSS-REFERENCE TO RELATED APPLICATIONS

This application claims the benefit of U.S. Provisional Application No. 61/697,697, filed on Sep. 6, 2012 and entitled "Compensating Specular Highlights for Non-Lambertian Projection Surfaces," the entire contents of which are incorporated herein by reference.

BACKGROUND OF THE INVENTION

1. Field of the Invention

The present invention generally relates to an image projector, and more particularly to architecture of generating view-dependent compensated images for a non-Lambertian surface.

2. Description of Related Art

Using an image projector in a mobile phone or digital camera greatly overcomes the screen size limitation of the handheld device and allows the image to be conveniently projected onto a bigger area on any nearby surface, such as a wall. Ideally, we would like the handheld projector to be able to project a clear image regardless of the physical characteristics of the projection surface. In practice, however, the projection surface available in the surroundings is often far from ideal and causes distortions to the projected image. As a result, compensation must be applied to the image before projection to counteract the non-ideal characteristics of the projection surface.

One fundamental assumption of most compensation techniques is that the camera is placed where the viewer is supposed to be. This assumption is easily violated since a projector-camera (procam) device can be placed at an angle with respect to the viewer. This nullifies the compensation calculated based on the assumption that the viewer and the camera are aligned or collocated at the same place. Thus, for non-Lambertian screens one should design a more general compensation algorithm that takes the viewing direction into consideration.

As a result, a need has arisen to propose a novel scheme of generating view-dependent compensated images for a non-Lambertian surface.

SUMMARY OF THE INVENTION

In view of the foregoing, it is an object of the embodiment of the present invention to provide a method of generating view-dependent compensated images for a non-Lambertian surface with multifold advantages. First, the embodiment provides a simple scheme that does not require additional projectors or cameras to reconstruct the reflection property of the surface—only one camera and one projector suffice. Second, the embodiment predicts the calibration images for different viewing angles from those captured at a single viewing angle, which greatly extends the capability of a procam system. Third, the embodiment introduces a feedback to re-estimate the specular light iteratively, which avoids overcompensation.

According to one embodiment, a procam system comprised of a projector and a camera is provided. A uniform image is projected on a reflective screen, resulting in a first captured image. The distribution of specular highlight is predicted according to the first captured image, thereby obtaining model parameters. Calibration images are estimated according to the model parameters and a viewing angle. A compensated image is generated according to the calibration images at the viewing angle.

DETAILED DESCRIPTION OF THE INVENTION

Figure 1:
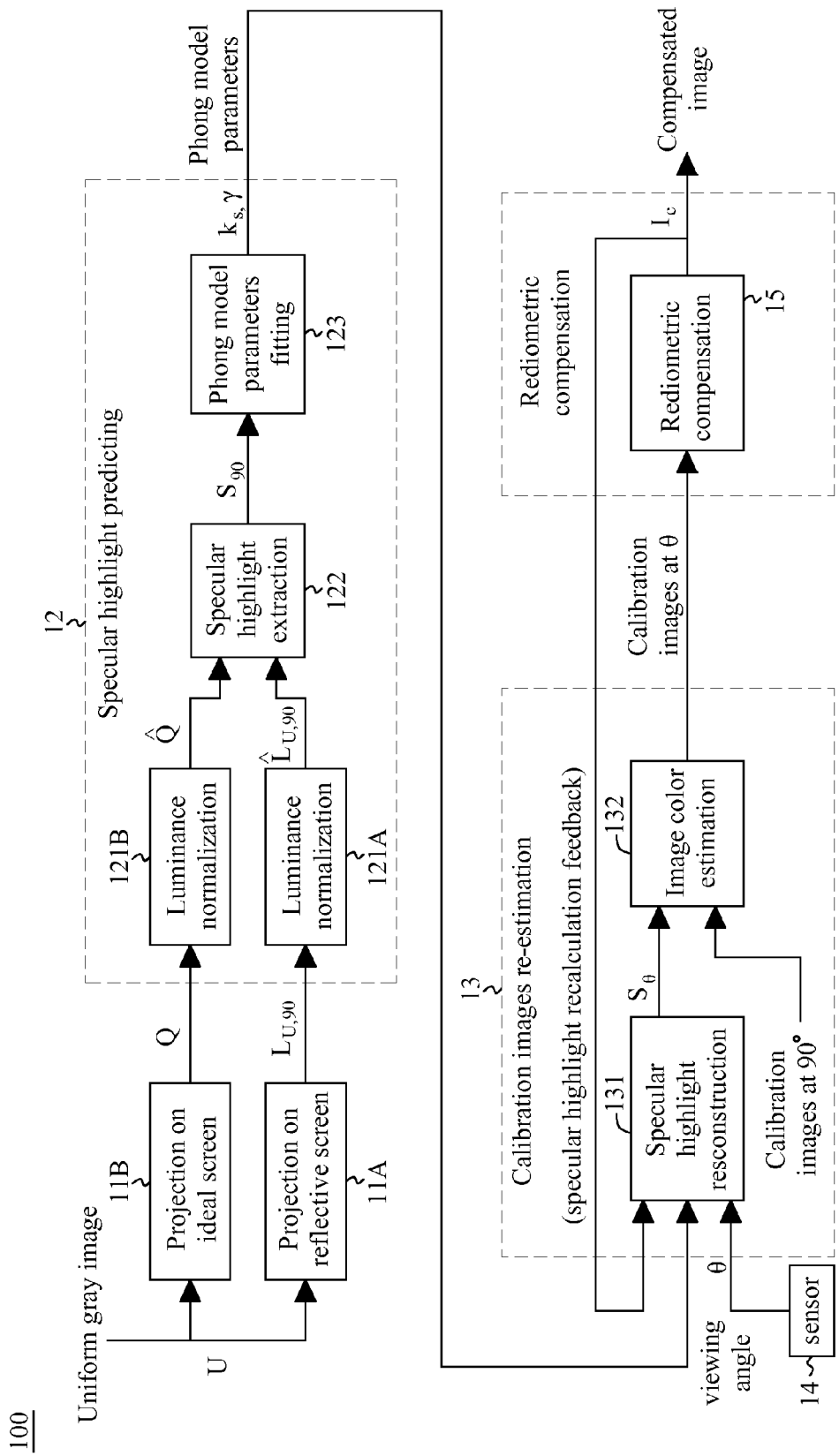
FIG. 1 shows a block diagram illustrative of architecture of generating view-dependent compensated images for a non-Lambertian surface according to one embodiment of the present invention.

FIG. 1 shows a block diagram illustrative of architecture 100 of generating view-dependent compensated images for a non-Lambertian (or reflective) surface according to one embodiment of the present invention. The composing blocks of FIG. 1 may be implemented by hardware or be performed, for example, by a digital signal processor.

Figure 2:
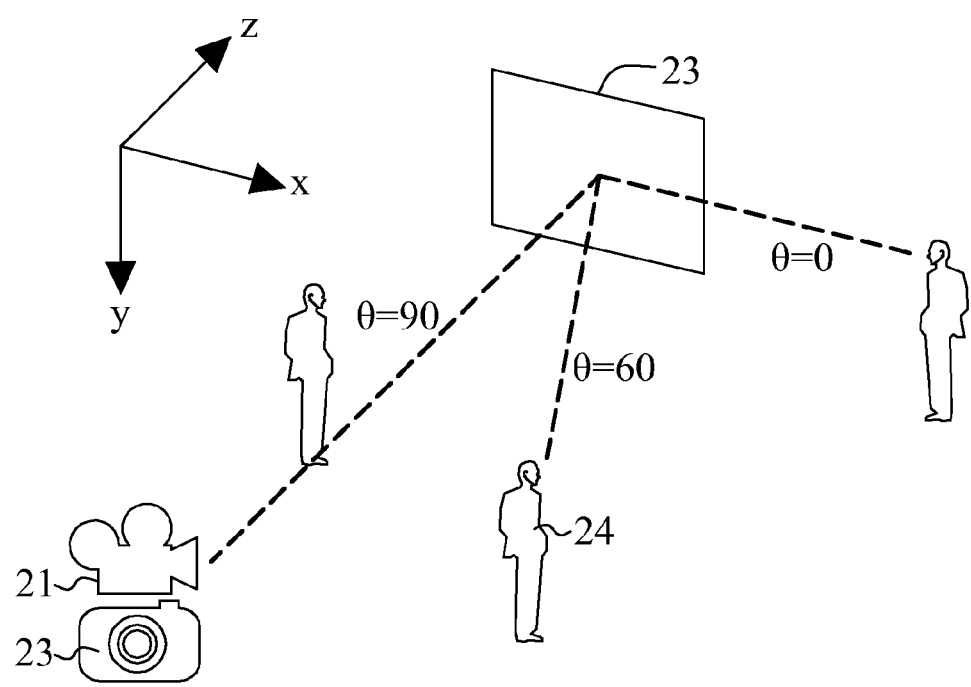
FIG. 2 shows an exemplary embodiment, to which a projector-camera system may be adapted.

FIG. 2 shows an exemplary embodiment, to which a projector-camera (procam) system 100A comprised of a projector 21 and a camera 22 bound together may be adapted. However, the embodiment, with minor modification, may also be adaptable to a procam system comprised of multiple projectors and cameras. As shown in FIG. 2, as a viewer 24 moves along xz-plane, a viewing angle θ, measured in degree, is thus defined. In the embodiment, the viewing angle θ is 90 when the viewer 24 stands right in front of a reflective screen 23.

As shown in FIG. 1, in unit 11A, a uniform image, e.g., a uniform gray image, U is projected on the reflective screen 23 (FIG. 2), resulting in a (first) captured image $L_{U,90}$.

While most of light is evenly scattered, a portion of light rays directly reflect as if the surface of the reflective screen 23 is a mirror. The mirror-like reflection of light is commonly known as specular highlight. The architecture 100, therefore, utilizes a unit for predicting distribution of the specular highlight. The embodiment adopts Phong model, as disclosed by B. T. Phong, "Illumination for computer generated pictures," Communications of the ACM, vol. 18, no. 6, pp. 311-317, 1975, the disclosure of which is incorporated herein by reference.

Specifically, the specular highlight predicting unit 12 includes a luminance normalization sub-unit 121A for normalizing the (first) captured image $L_{U,90}$, resulting in a (first) normalized captured image $\hat{L}_{U,90}$, with value ranging from 0 to 1, denoting spatial variation of the luminance. In addition to the specular highlight, the luminance variation is also caused by vignetting, introduced by imperfection of lens, which often results in luminance reduction at the periphery of a photo. Therefore, vignetting factor need be estimated and excluded before reconstructing the Phong model.

Specifically, the vignetting effect may be calculated, in unit 11B, by projecting the same uniform image U onto an ideal projection screen (not shown), which is assumed to be highly, if not perfectly, diffusive, resulting in a (second) captured image Q. The (second) captured image Q is then normalized, by a luminance normalization sub-unit 121B, to obtain a (second) normalized captured image $\hat{Q}$, which is the luminance variation caused by pure vignetting. Subsequently, in specular highlight extraction sub-unit 122, specular highlight $S_{90}$ may be extracted by $$S_{90}(x, y) = \frac{\hat{L}_{U,90}(x, y)}{\hat{Q}(x, y)}.$$

Afterwards, in Phong model parameters fitting sub-unit 123, Phong model parameters $k_s$ and $\gamma$ may be obtained, for example, by linear regression, for describing the specular highlight $I_s$ as $$I_s = k_s(\hat{R} \cdot \hat{V})^\gamma i_s$$

where $k_s$ is a specular reflection constant, $\hat{R}$ is a direction of a perfectly reflected light, $\hat{V}$ is a direction toward the viewer 24, $\gamma$ is a shininess constant for screen material, and $i_s$ is intensity of a light source.

After obtaining parameters (e.g., $k_s$ and $\gamma$) of model for predicting distribution of the specular highlight, the process of the architecture 100 proceeds to a unit 13 of estimating calibration images. Specifically, in a specular highlight reconstruction sub-unit 131, a specular highlight $S_\theta$ at an arbitrary viewing angle $\theta$ may be reconstructed or predicted based on the model parameters and the viewing angle $\theta$, obtained, for example, by a sensor 14. Subsequently, in an image color estimation sub-unit 132, luminance difference $D_\theta$ between the specular highlight seen at 90° C. and $\theta$ is first generated, (that is, $D_\theta = s_L(S_\theta - S_{90})$, where $s_L$ is a scaling factor), and plural calibration images at $\theta$ are estimated by adding the luminance difference $D_\theta$ (of $S_{90}$ and $S_\theta$) to calibration images at 90°. That is, $$L_{M,\theta} = L_{M,90} + n(S_\theta - S_{90}), M \in \{R,G,B,U,S\}$$

where n is a scaling factor.

In the embodiment, the calibration images $L_{M,\theta}$ comprise four uniform-colored images (red, green, blue and gray) and one color ramp image consisting of pixels from gray-level 0 to gray-level 255.

Figure 3:
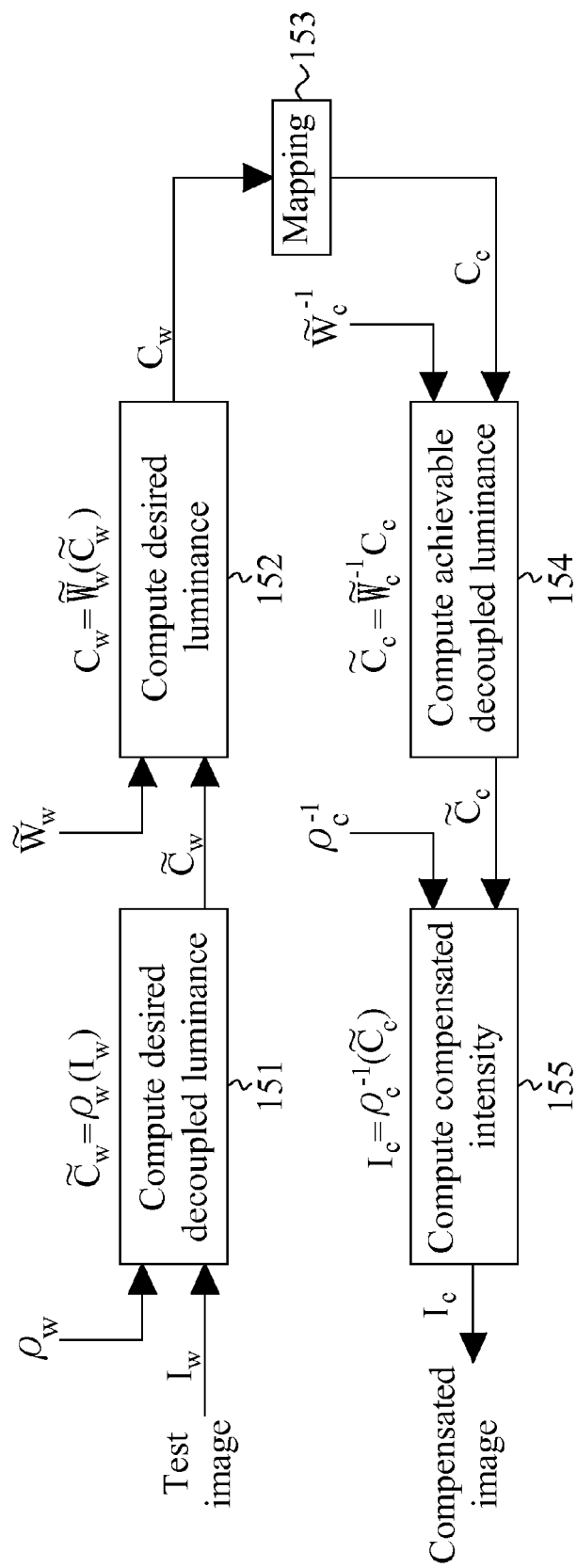
FIG. 3 shows a detailed block diagram of the radiometric compensation unit of FIG. 1.

Still referring to FIG. 1, a radiometric compensation unit 15 is utilized to generate a compensated image $I_c$ according to the calibration images $L_{M,\theta}$ at $\theta$. FIG. 3 shows a detailed block diagram of the radiometric compensation unit 15 of FIG. 1 for generating a compensated image $I_c$ that, when projected on the reflective (or colored) screen 23, is perceived almost the same as projection of a test image $I_w$ on a white screen. Specifically, in sub-unit 151, the test image $I_w$ is converted first to a desired decoupled luminance $\tilde{C}_w$ by a mapping $\rho$ w, which is a monotonic function in the embodiment. Then, in sub-unit 152, a desired luminance $C_w$ is generated by multiplying the decoupled luminance $\tilde{C}_w$ by a color matrix $\tilde{W}_w$, which captures coupling between each color channel of the projector 21 and the camera 22. Here, the desired luminance $C_w$ serves as a simulation of the perceived luminance supposing the test image $I_w$ is projected on the white screen. Thereafter, the desired luminance $C_w$ is subject to mapping 153, e.g., tone mapping, that compresses dynamic range within a recoverable range while performing compensation toward photometric correctness, therefore resulting in a mapped desired luminance $C_c$. The tone mapping, however, reduces image contrast. Therefore, tradeoff between the photometric correctness and the contrast should be optimized, for example, by maximizing the number of pixels that lie within the recoverable dynamic range, while preserving as much contrast as possible. Afterwards, sub-unit 154 obtains an achievable decoupled luminance $\tilde{C}_c$, according to the mapped desired luminance $C_c$, by decoupling the color channels.

Finally, in sub-unit 155, the achievable decoupled luminance $\tilde{C}_c$ is mapped to an 8-bit pixel value, therefore resulting in the compensated image $I_c$.

The luminance of the projected light determines the chroma and the intensity of the specular highlight. In particular, when a compensated image is projected, the specular highlight slightly differs from that estimated in the initial condition, under which the calibration image is projected. This often leads to over-compensation. Accordingly, as shown in FIG. 1, specular highlight feedback is incorporated to recalculate, in sub-unit 131, the specular highlight $S_\theta$ based on the content of the compensated image $I_c$. In the embodiment, the intensity of specular highlight $i_s$ is changed to $i_c$ according to the following equation:

$$i_c = i_s \frac{\bar{I}_c}{\bar{U}}$$

where $\bar{U}$ and $\bar{I}_c$ are average luminance of U and $I_c$, respectively, for example, by iterating the feedback loop three times.

Although specific embodiments have been illustrated and described, it will be appreciated by those skilled in the art that various modifications may be made without departing from the scope of the present invention, which is intended to be limited solely by the appended claims.

What is claimed is:

1. A method of generating view-dependent compensated images, comprising:
   providing a procam system comprised of a projector and a camera;
   projecting a uniform image on a reflective screen, resulting in a first captured image;
   projecting the uniform image onto an ideal projection screen that is substantially diffusive, resulting in a second captured image;
   predicting distribution of specular highlight according to the first captured image and the second captured image, thereby obtaining model parameters;
   estimating calibration images according to the model parameters and a viewing angle; and
   generating a compensated image according to the calibration images at the viewing angle.

2. The method of claim 1, wherein the distribution of specular highlight is predicted based on Phong model, thereby obtaining Phong model parameters by linear regression.

3. The method of claim 1, wherein the step of predicting the distribution of specular highlight comprises:
   normalizing the first captured image, resulting in a first normalized captured image;
   normalizing the second captured image, resulting in a second normalized captured image; and
   extracting the specular highlight as a ratio of the first normalized captured image to the second normalized captured image.

4. The method of claim 1, wherein the step of estimating the calibration images comprises:
   reconstructing a specular highlight at the viewing angle based on the model parameters and the viewing angle;
   generating luminance difference between a specular highlight seen at 90 degrees and the viewing angle; and
   estimating a plurality of calibration images at the viewing angle by adding the luminance difference to calibration images at 90 degrees.

5. The method of claim 4, wherein the plurality of calibration images comprises one color ramp image and four uniform-colored images of red, green, blue and gray, respectively.

6. The method of claim 4, wherein the specular highlight is reconstructed further based on the compensated image by feeding back the compensated image before reconstructing the specular highlight.

7. The method of claim 1, wherein the viewing angle is provided by a sensor.

8. The method of claim 1, when the compensated image is projected on the reflective screen, the compensated image is perceived substantially the same as projection of a test image on a white screen.

9. The method of claim 8, wherein the step of generating the compensated image comprises:

converting the test image to a desired decoupled luminance by first mapping;

generating a desired luminance by multiplying the decoupled luminance by a color matrix, which captures coupling between each color channel of the projector and the camera;

subjecting the desired luminance to second mapping, that compresses dynamic range within a recoverable range while performing compensation toward photometric correctness, therefore resulting in a mapped desired luminance;

obtaining an achievable decoupled luminance according to the mapped desired luminance by decoupling the color channels; and third mapping the achievable decoupled luminance to an 8-bit pixel value, therefore resulting in the compensated image.

10. The method of claim 9, wherein the first mapping is a monotonic function.

11. The method of claim 9, wherein the second mapping is tone mapping.

12. The method of claim 1, wherein the projector and the camera of the procam system are bound together.

* * * * *